(12) United States Patent
Duan et al.

(10) Patent No.: US 8,797,730 B2
(45) Date of Patent: Aug. 5, 2014

(54) SLIDING MODULE FOR ELECTRONIC DEVICE

(75) Inventors: Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 337 days.

(21) Appl. No.: 13/220,186

(22) Filed: Aug. 29, 2011

(65) Prior Publication Data

US 2012/0293927 A1 Nov. 22, 2012

(30) Foreign Application Priority Data

May 16, 2011 (CN) .......................... 2011 1 0125274

(51) Int. Cl.
*H05K 7/00* (2006.01)
(52) U.S. Cl.
USPC .............. 361/679.27; 361/679.01; 361/679.3; 361/679.56; 455/575.1; 455/575.3; 455/575.4
(58) Field of Classification Search
USPC ............. 361/679.01, 679.02, 679.05, 679.06, 361/679.07, 679.21, 679.26, 679.27, 361/679.28, 679.3, 679.55, 679.56, 679.58, 361/814; 16/361; 455/550.1, 556.1, 556.2, 455/556, 575.1, 566, 575.3, 575.4; 379/433.11, 433.12
See application file for complete search history.

(56) References Cited

U.S. PATENT DOCUMENTS

| | | | | |
|---|---|---|---|---|
| 8,233,276 | B2 * | 7/2012 | Wu et al. .................. | 361/679.55 |
| 8,248,788 | B2 * | 8/2012 | Wu et al. .................. | 361/679.55 |
| 8,254,104 | B2 * | 8/2012 | Wu et al. .................. | 361/679.3 |
| 8,422,204 | B2 * | 4/2013 | Wang ....................... | 361/679.01 |
| 8,428,663 | B2 * | 4/2013 | Sano et al. ................ | 455/575.1 |
| 8,444,214 | B2 * | 5/2013 | Helferty et al. .......... | 296/193.06 |
| 8,494,597 | B2 * | 7/2013 | Wu et al. .................. | 455/575.1 |
| 8,532,723 | B2 * | 9/2013 | Ahn et al. ................. | 455/575.4 |

* cited by examiner

*Primary Examiner* — Angel R Estrada
*Assistant Examiner* — Dimary Lopez Cruz
(74) *Attorney, Agent, or Firm* — Novak Druce Connolly Bove + Quigg LLP

(57) ABSTRACT

A sliding module includes a first section, a second section, a pivot plate, a hinge module and an assist lever. Two sides of the pivot plate are respectively rotatably connected to the first section and the hinge module. The hinge module is positioned on the second section. Two ends of the assist lever are respectively rotatably connected to the first section and the second section. The first section brings the pivot plate to rotate relative to the hinge module, and elevates the assist lever, the pivot plate and the assist lever bring the first section to move and rotate relative to the second section in a tilted orientation.

9 Claims, 6 Drawing Sheets

SLIDING MODULE FOR ELECTRONIC DEVICE

BACKGROUND

1. Technical Field

The present disclosure generally relates to electronic devices, and particularly to a sliding module for an electronic device.

2. Description of Related Art

Portable electronic devices such as mobile phones, laptops, and personal digital assists (PDAs) are widely used. As such, the sales and use of slide-type portable electronic devices have been on the increase. A slide-type portable electronic device has two housings, which can open and close relative to each other with the use of a slide mechanism.

However, the slide-type devices typically only allow the two housings to slide parallel to each other. Therefore, when the slide-type is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
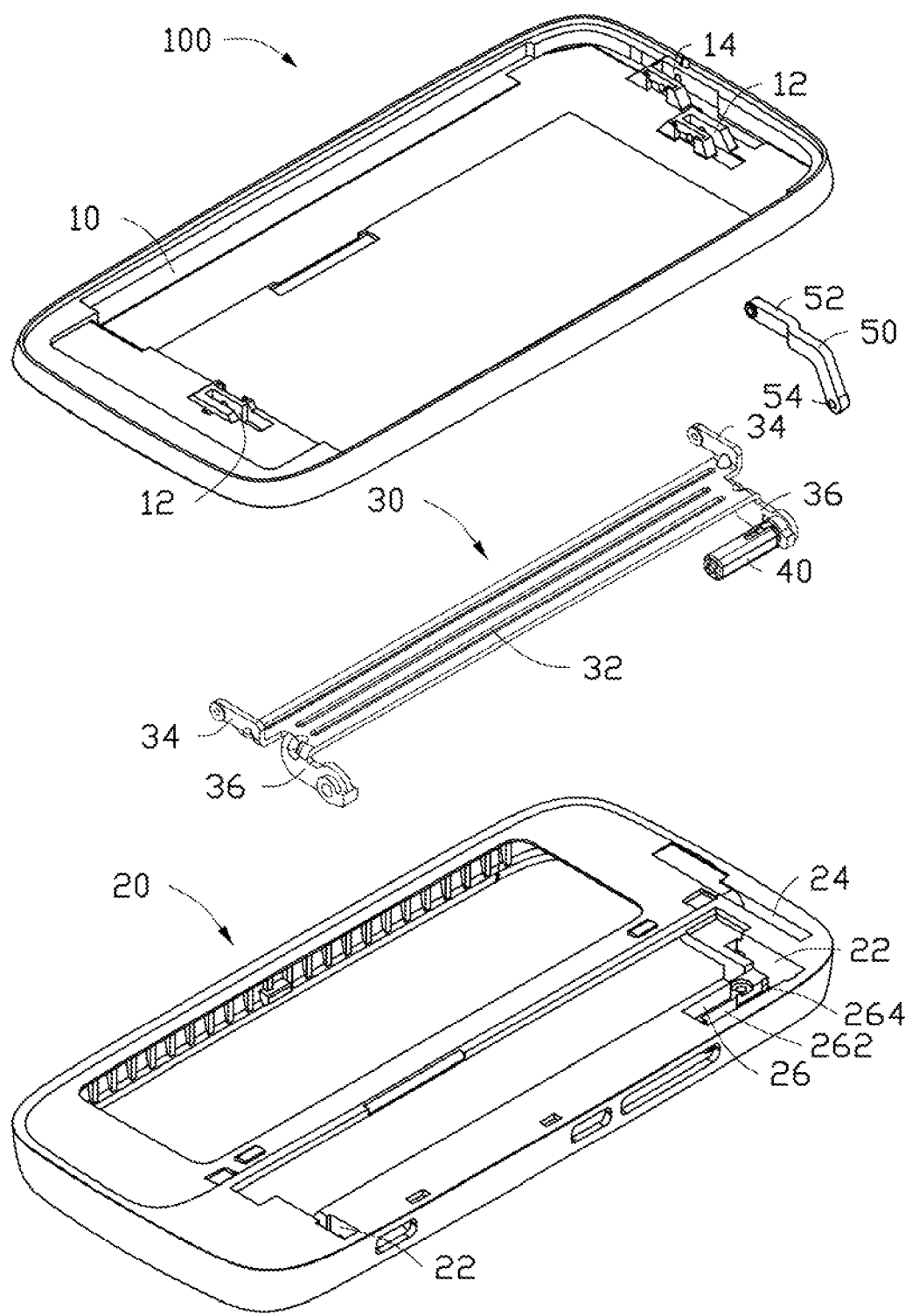
FIG. 1 is an exploded, isometric view of an electronic device according to an exemplary embodiment.

FIG. 1 shows an exemplary embodiment of a sliding module 100 applied in an electronic device, such as a mobile phone, or a personal digital assist. The sliding module 100 can be in a closed orientation and a tilted open orientation. The sliding module 100 includes a first section 10, a second section 20, a pivot plate 30, a hinge module 40, and an assist lever 50. In the closed orientation, the first section 10 and the second section 20 overlap each other. In the tilted open orientation, the first section 10 is tilted relative to the second section 20 for better viewing.

The first section 10 defines two retaining grooves 12 at opposite sides of a surface thereof for connecting one side of the pivot plate 30. A receiving groove 14 is defined in the first section 10 adjacent to one of the retaining grooves 12 for connecting one end of the assist lever 50.

The second section 20 defines two notches 22 at opposite sides of a surface to connect the other side of the pivot plate 30. A slot 24 is defined in the surface of the second section 20 adjacent to one of the notches 22. The other end of the assist lever 50 is connected to the slot 24. A receiving portion 26 is formed on the second section 20 to communicate with the adjacent notch 22. The receiving portion 26 defines a receiving cavity 262 and a limiting groove 264. The limiting groove 264 communicates the receiving cavity 262 with the adjacent notch 22. The hinge module 40 is received in the receiving cavity 262.

Figure 2:
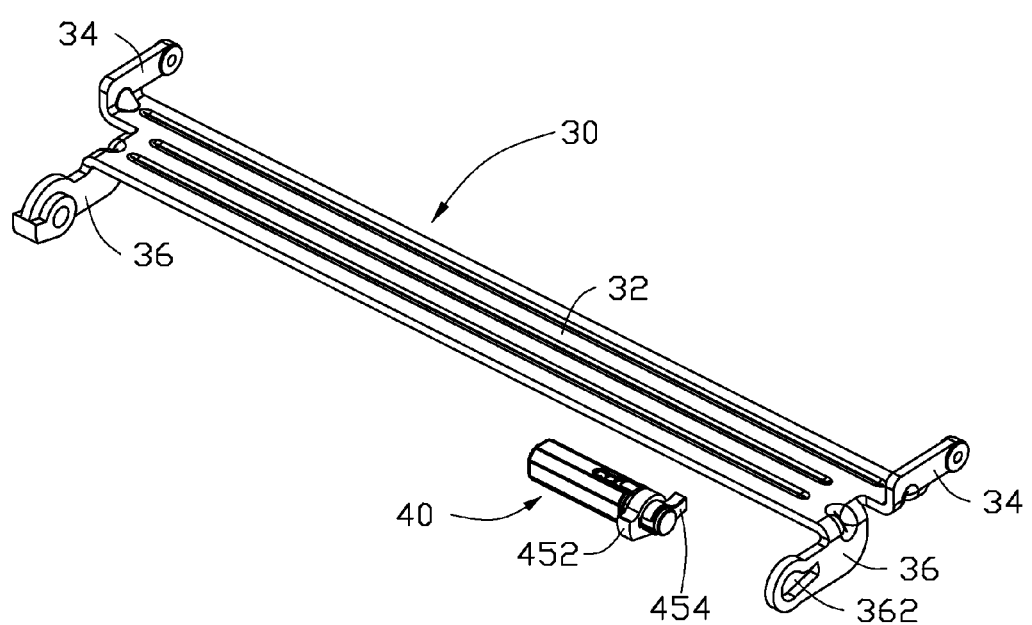
FIG. 2 is an isometric view of a hinge assembly and a pivot plate used in the electronic device shown in FIG. 1.

Referring to FIG. 2, the pivot plate 30 includes a main body 32, and two pairs of first, second support arms 34, 36 formed at two sides of the main body 32. The pair of first support arms 34 is rotatably connected to the retaining grooves 12, and the pair of second support arms 36 is rotatably connected to the notches 22. One of the second support arms 36 defines a hole 362 for non-rotatably connecting the hinge module 40. In this exemplary embodiment, the hole 362 is made up of a circular hole and a cutout recessed from one side of the circular hole. The cutout extends from a length direction of the support arm 36. A length of the hole 362 along the length direction of the second support arm 36 is longer than a width of the hole 362 perpendicular to the length direction.

Figure 3:
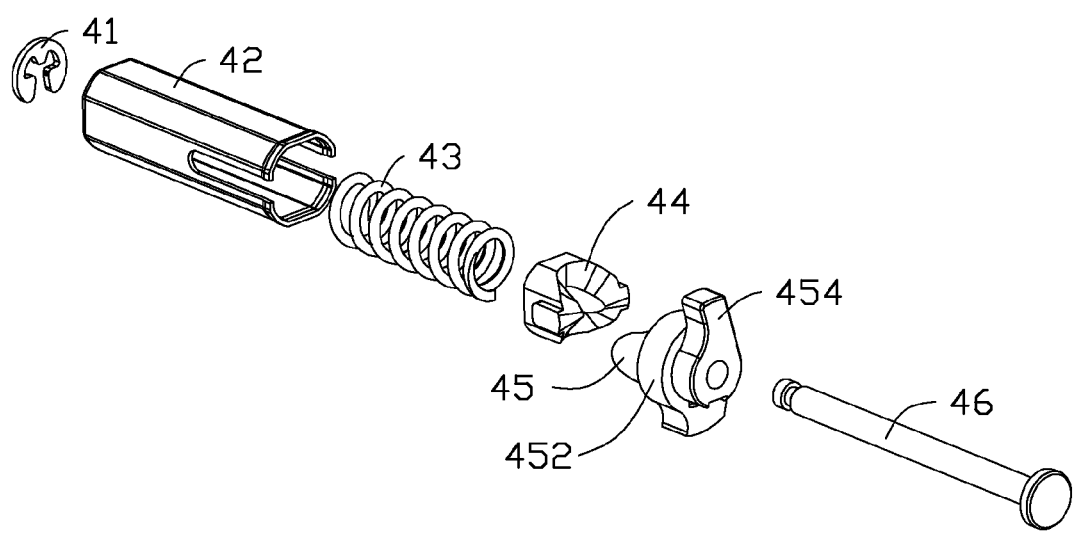
FIG. 3 is an exploded, isometric view of the hinge assembly shown in FIG. 2.

Referring to FIG. 3, the hinge module 40 includes a washer 41, a sleeve 42, a resilient member 43, a follower 44, a cam 45, and a shaft 46. The cam 45, the follower 44, and the resilient member 43 are fitted over the shaft 46, and are received in the sleeve 42. The washer 41 is latched to one end of the shaft 46 with the above elements to assemble a unit. The follower 44 is non-rotatably engaged in the sleeve 42. The sleeve 42 can be received in the receiving cavity 262. The follower 44 includes peaks and valleys, and the cam 45 can slide over the peaks of the follower 44 to allow the cam 45 to rotate relative to the follower 45. In this exemplary embodiment, the cam 45 includes a first block 452 and a second block 454 coaxially connected to each other. The first block 452 is rotatably received in the limiting groove 264, and the second block 454 is received in the hole 362. The first block 452 and the second block 454 are substantially whistle-shaped, and tip portions of the blocks, 452, 454 are arranged at 180 degrees.

The assist lever 50 includes a first connecting end 52 and a second connecting end 54 integrally formed together. The first connecting end 52 is received in the receiving groove 14, and is connected to the first section 10 with a post (not shown). The second connecting end 54 is received in the slot 24 to be connected to the second section 20.

Figure 4:
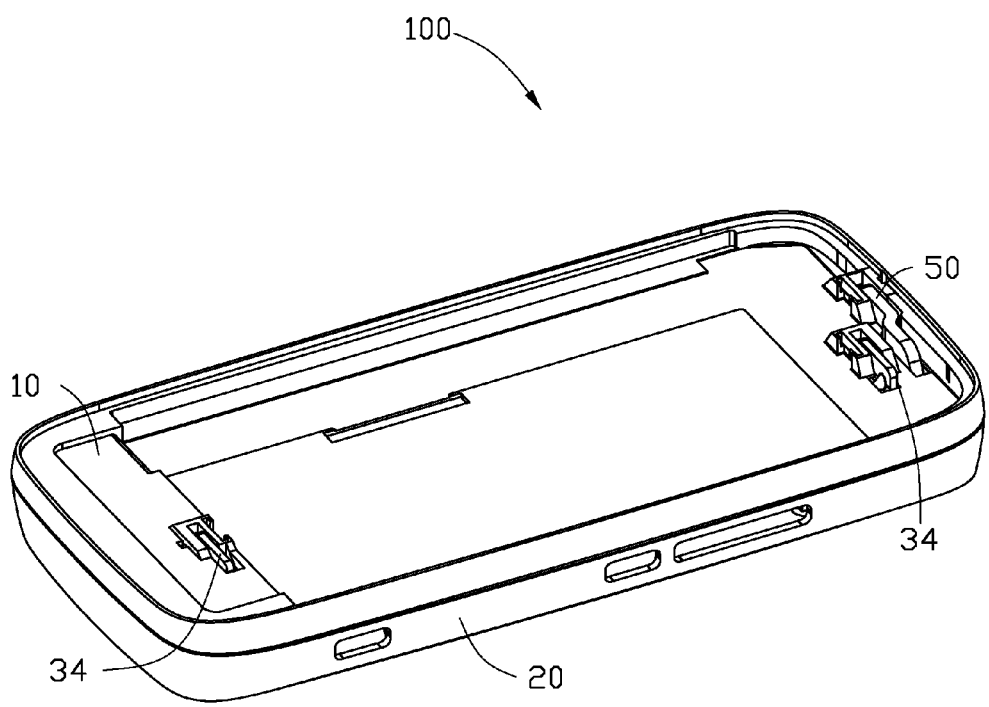
FIG. 4 is an isometric view of the electronic device of FIG. 1 in a closed orientation.

In assembly, referring to FIG. 4, the pair of first support arms 34 is rotatably connected to the retaining grooves 12, and the pair of second support arms 36 is rotatably connected to the notches 22. The hole 362 is aligned with the receiving cavity 262 and the limiting groove 264. The assembled hinge module 40 is assembled to the receiving cavity 262, and the first block 452 is received in the limiting groove 264, and the second block 454 is received in the hole 362 of the pivot plate 30 for connecting the pivot plate 30 to the first section 10 and the second section 20. The first connecting end 52 is connected to the receiving groove 14, and the second connecting end 54 is connected to the slot 24. Accordingly, the sliding module 100 is assembled.

When the sliding module 100 is in a closed orientation, the first section 10 is parallel to and overlaps the second section 20. The first support arms 34 are received in the retaining grooves 12, and the second support arms 36 are received in the notches 22. The assist lever 50 is received in the receiving groove 14 and the slot 24.

Figure 5:
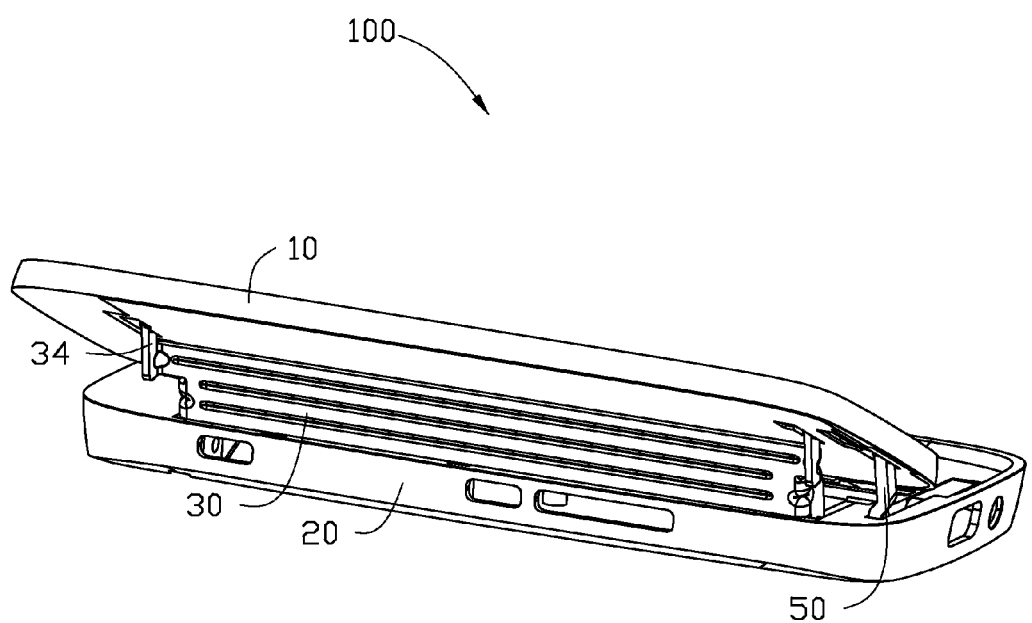
FIG. 5 is an isometric view of the electronic device of FIG. 4 in an open orientation.
Figure 6:
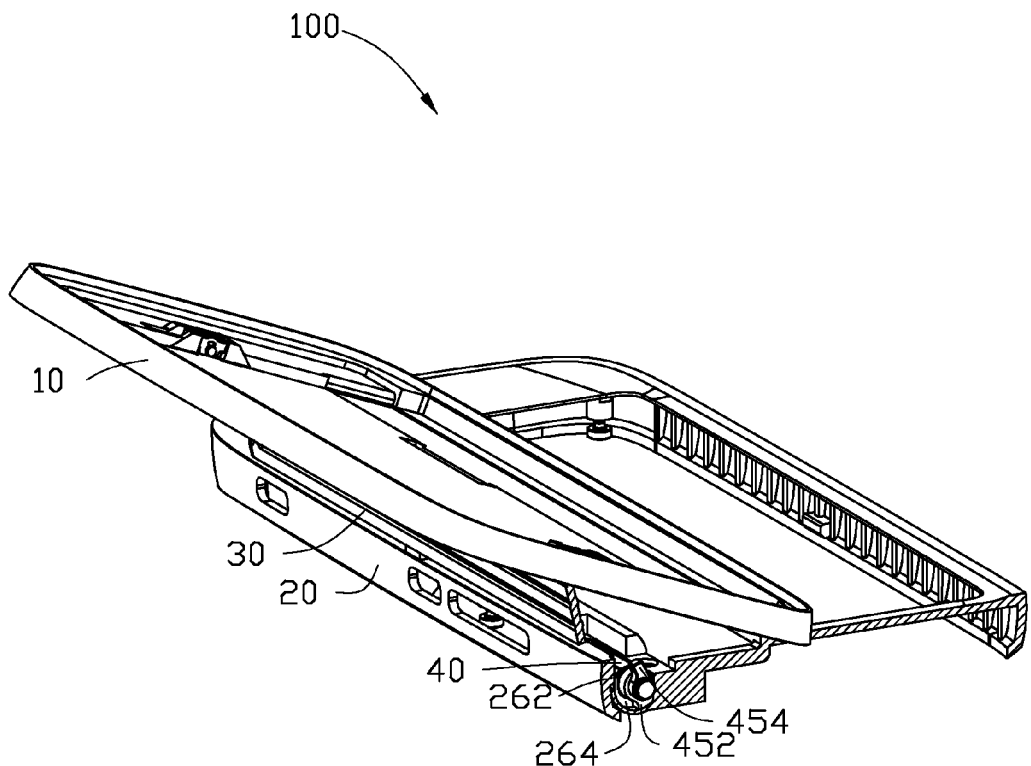
FIG. 6 is a schematic view of the electronic device of FIG. 5, showing the position of the pivot plate.

Referring to FIGS. 5 and 6, when the sliding module 100 is to be opened, a user may apply a force to the first section 10 to move the first section 10 away from the second section 20. The pivot plate 30 and the assist lever 50 are forced to rotate, and further elevate the first section 10. The cam 45 is driven by the pivot plate 30 to rotate relative to the follower 44. When the cam 45 slides over the peaks of the follower 44, the cam 45 automatically rotates the pivot plate 30 until the first section 10 is completely opened relative to the second section 20. The first section 10 is supported in a tilted position relative to the second section 20.

The sliding module 100 can be applied in a portable electronic device such as a mobile phone. The electronic device includes a cover and a housing engagable with the cover. The cover is secured to the first section 10, and the housing is secured to the second section 20. Thus, the portable electronic device opens or closes with use of the sliding module 100.

The second support arm 36 defines a hole 362. The manufacture of the hole 362 relative to a conventional hole is easy. In addition, the shape of the hole 362 allows a small force needed to rotate the support arm 36, and as an added benefit the second support arm 36 may be thinner.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
    a first section;
    a second section including a receiving portion defining a receiving cavity and a limiting groove, the limiting groove communicating with the receiving cavity;
    a pivot plate including a main body, and a pair of first support arms, a pair of second support arms, each of the second support arms formed at one of the two sides of the main body;
    a hinge module positioned on the second section, the first support arms rotatably connected to the first section the second support arms rotatably connected to the second section and the hinge module;
    an assist lever, two ends of the assist lever respectively rotatably connected to the first section and the second section;
    wherein the first section brings the pivot plate to rotate relative to the hinge module, and elevates the assist lever, the pivot plate and the assist lever moving and rotating the first section relative to the second section and into a tilted orientation;
    wherein one of the second support arms defines a hole for non-rotatably connecting the hinge module, the hole comprising a circular hole and a cutout recessed from one side of the circular hole, and the cutout extends in a longitudinal direction of the second support arm, the hinge module includes a sleeve and a cam, the sleeve is received in the receiving, cavity, the cam includes a first block and a second block coaxially connected to each other, the first block is rotatably received in the limiting groove, and the second block is received in the hole.

2. The sliding module as claimed in claim 1, wherein a length of the hole along the length direction of the second support arm is greater than a width of the hole perpendicular to the length direction.

3. The sliding module as claimed in claim 1, wherein the second section defines two notches, each notch at one of the two opposite sides of a surface thereof for connecting one side of the pivot plate, a slot is defined in the surface of the second section adjacent to one of the notches.

4. The sliding module as claimed in claim 1, wherein the first block and the second block are substantially whistle-shaped, and tip portions of the blocks are arranged at 180 degrees.

5. The sliding module as claimed in claim 1, wherein the assist lever includes a first connecting end and a second connecting end integrally formed together, the first connecting end is connected to the first section, the second connecting end is connected to the second section.

6. An electronic device comprising:
    a first section;
    a second section;
    a pivot plate including a main body, and a pair of first support arms, each of the second support arms formed at one of the two sides of the main body;
    a hinge module positioned on the second section, the first support arms rotatably connected to the first section the second support arms rotatably connected to the second section and the hinge module;
    an assist lever, two ends of the assist lever respectively rotatably connected to the first section and the second section;
    wherein the first section brings the pivot plate to rotate relative to the hinge module, and elevates the assist lever, the pivot plate and the assist lever moving and rotating the first section relative to the second section and into a tilted orientation;
    wherein a receiving portion is formed on the second section, the receiving portion defines a receiving cavity and a limiting groove, the pivot plate defines a hole comprising a circular hole and a cutout recessed from one side of the circular hole, and the cutout extends in a longitudinal direction of the second support arm, the hinge module includes a sleeve and a cam, the sleeve is received in the receiving cavity, the cam includes a first block and a second block coaxially connected to each other, and the first block is rotatably received in the limiting groove, and the second block is received in the hole.

7. The electronic device as claimed in claim 6, wherein the assist lever includes a first connecting end and a second connecting end integrally formed together, the first connecting end is connected to the first section, the second connecting end is connected to the second section.

8. The electronic device as claimed in claim 6, wherein a length of the hole along the length direction of the second support arm is greater than a width of the hole perpendicular to the length direction.

9. The electronic device as claimed in claim 6, wherein the first block and the second block are substantially whistle-shaped, and tip portions of the blocks are arranged at 180 degrees.

* * * * *